May 17, 1966
L. O. REICHELT
3,251,179
MATERIAL TWISTING APPARATUS
Filed Dec. 26, 1963
2 Sheets-Sheet 1
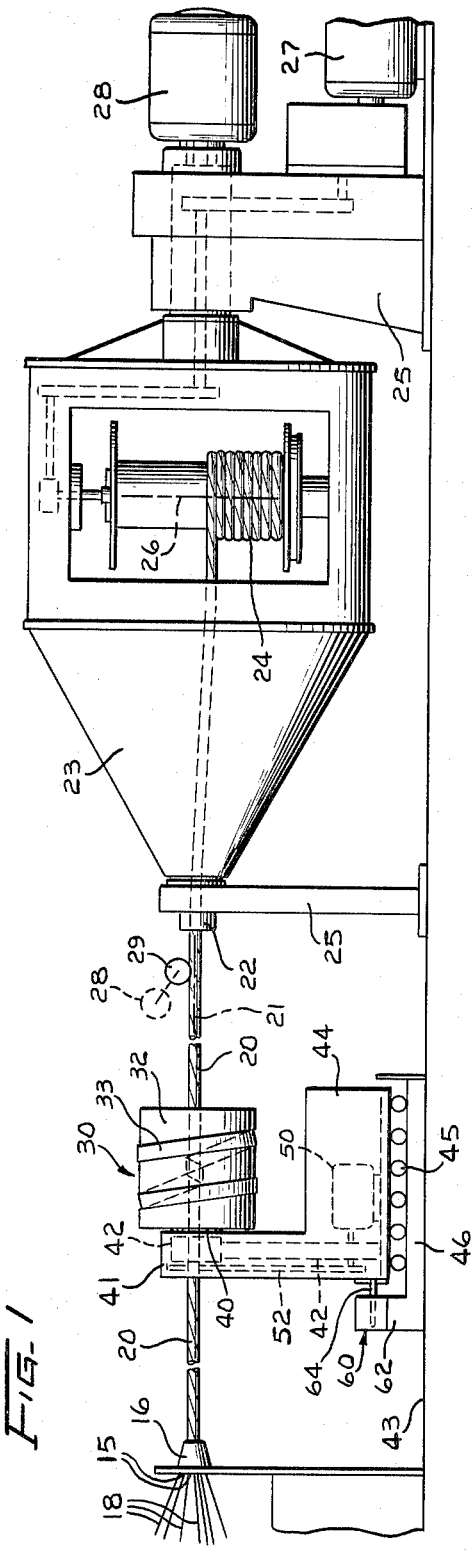
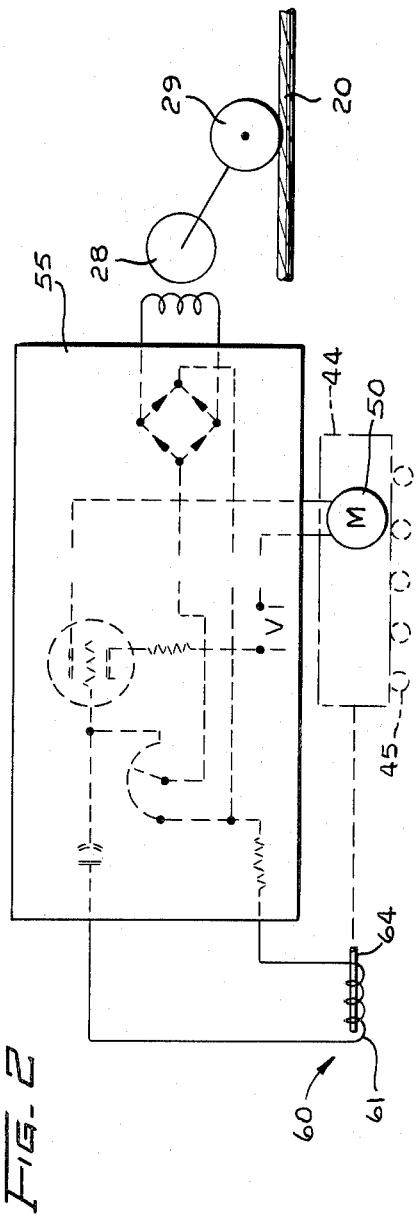
INVENTOR
L.O. REICHELT
BY A.C. Schwar, Jr.
ATTORNEY

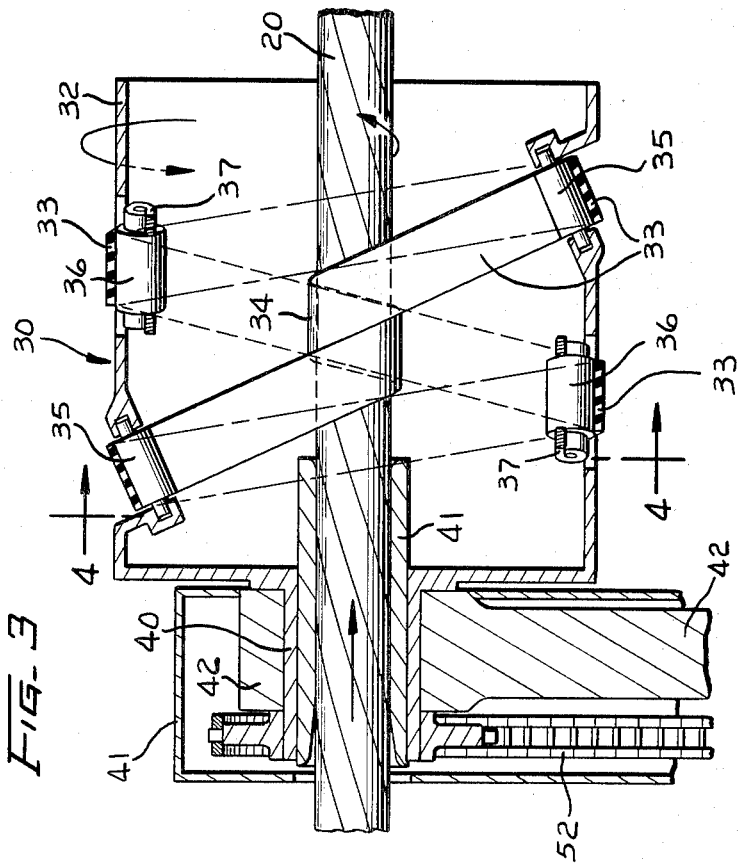

United States Patent Office 3,251,179
Patented May 17, 1966

3,251,179
MATERIAL TWISTING APPARATUS
Lester O. Reichelt, Naperville, Ill., assignor to Western Electric Company, Incorporated, New York, N.Y., a corporation of New York
Filed Dec. 26, 1963, Ser. No. 333,309
6 Claims. (Cl. 57—66.5)

The present invention relates to a material twisting apparatus, and more particularly to a cable fabricating apparatus for uniformly twisting successive portions of a cable.

An object of the invention is to provide an improved apparatus for twisting material of indefinite length.

A further object of the invention is to provide a cable fabricating apparatus for imparting a uniform twist to successive portions of the cable as the cable advances through a zone of predetermined length.

An apparatus disclosing certain aspects of the invention may include a stationary apertured guide for guiding the cable components of indefinite length into engagement with one another to form a cable and to hold the cable at this point against rotation as the cable advances therefrom along a first axis, a cradle mounted for rotation about such first axis, a take-up reel mounted on the cradle for rotation therewith and for rotation relative thereto about an axis transversely of the first axis, and an endless twisting belt, a portion of which belt is helically wound around a portion of the advancing cable to form a gripping engagement therewith between the apertured guide and the take-up reel and at a predetermined distance form the former.

The twisting belt is supported on and is driven by a rotatable twisting head mounted concentric with the cable. The twisting head is rotated by a motor drive in timed relation to the advancing movement of the cable to wind and unwind successive portions of the twisting belt onto and from successive portions of the advancing cable and thereby rotate such portions of the cable in synchronism with the rotation of the cradle and the advancing movement of the cable to impart a uniform twist to the section of cable extending between the twisting belt and the apertured guide.

Other objects, advantages and novel aspects of the invention will become apparent upon consideration of the following detailed description, in conjunction with the accompanying drawings, in which:

FIG. 1 is a diagrammatic fragmentary view of a cable fabricating apparatus embodying the present invention;

FIG. 2 is a fragmentary diagrammatic view of the control system for effecting the synchronization between the rotation of the twisting device and the advancing movement of the cable;

FIG. 3 is an enlarged vertical longitudinal sectional view through the twisting head of the apparatus; and FIG. 4 is a vertical cross-sectional view of the twisting head taken on the line 4—4 of FIG. 3.

Referring to FIG. 1 of the drawings, the cable fabricating apparatus comprises a stationary apertured face plate 15 and a closing die 16 which guide the several cable components 18 of indefinite length from supplies thereof into engagement with one another to form a cable 20 and to hold the end of the cable against rotation as the cable moves from the die 16 along a horizontal axis 21. At a region spaced from the closing die 16, the cable is supported in a guide 22 as it enters a cradle 23 and advances to and is wound onto a take-up reel 24. The cradle 23 is mounted in standards 25 for rotation about the horizontal axis 21 and supports the take-up reel 24 for rotation therewith about such axis 21 and for rotation about an axis 26 perpendicular to the axis 21. The take-up cradle 23 and the reel 24 are driven in timed relation to each other by drives including motors 27 and 28, respectively.

Control mechanism including a tachometer 28 driven by a roller 29 riding on the cable 20 is provided for synchronizing the cradle drive 27 and the take-up reel drive 28 so as to take up the cable at a uniform rate and permit the application thereto of a predetermined uniform twist. The drive for the cradle 23 and the reel 24 is disclosed in the L. O. Reichelt et al. Patent 3,024,588.

The rotation of the cradle 23 effects the twisting of the portion of the moving cable 20 which extends from the stationary closing die 16 to the revolving take-up reel 24. However, since it has been found that the twisting of the cable over such an extended length is not uniform, and produces uneven torsional stresses in the cable which create difficulties during the subsequent application of a protective sheathing to the cable, an auxiliary twisting device 30 is provided to impart a uniform twist to the cable. The twisting device 30 is located between the take-up reel 24 and the closing die 16 and at a predetermined distance from the latter and serves to apply a uniform twist to successive portions of the cable of a predetermined length as such portions of the cable advance through the zone extending from the closing die 16 to the twisting device 30.

The twisting device comprises a rotary twisting head 32 disposed concentric with the axis 21 for supporting an endless twisting belt 33. The belt has a portion thereof wound spirally around the cable 20 through at least one complete convolution to form a loop 34 for gripping a portion of the cable 20 securely so as to preclude longitudinal movement of the belt relative to the cable. The remainder of the belt is supported on the outer periphery of the head 32, a pair of guide rollers 35, and a pair of tension rollers 36 supported in different positions on the head. The rollers 36 are carried in the ends of arms 37 that are pivotally mounted on the head 32 and are biased by adjustable springs 38 to effect the tensioning of the belt 33.

The head 32 has a hollow hub 40 through which the cable passes and a sleeve 41 mounted in the hub for forming the cable components into a symmetrical cable and to support the cable adjacent the loop 34 of the twisting belt against lateral displacement. The hub 40 is journaled in a bearing on an upwardly extending standard 42 which may be secured to a base 43 of the apparatus for supporting the twisting head 32 against movement in a direction parallel to the axis 21. Preferably, the standard 42 is mounted on a carriage 44 which is supported for limited longitudinal movement, parallel to the axis 21, by anti-friction guides 45 on a base plate 46 which is secured to the base 43.

Rotation is imparted to the twisting head 32 by a motor 50 which is mounted on the carriage 44 and is operatively connected to the twisting head hub 40 through a sprocket and chain connection 52. The motor 50 is electrically connected to a variable power supply and a control circuit therefor which is indicated thereof diagrammatically at 55 in FIG. 2 and includes the tachometer 28. The A.C. signal generated by the tachometer 28 is rectified and fed to the control circuit to control the D.C. power to the motor and thereby regulate the speed thereof so as to obtain a rate of rotation of the twisting head 32 in synchronism with the rate of movement of the cable 20 and the rate of rotation of the cradle 23.

As the twisting head 32 rotates in the direction indicated by the arrow 53 (FIG. 4) successive portions of the belt 33 are directed tangentially from one of the guide rollers 35 onto the advancing cable and wound helically therearound to form the cable gripping loop 34 and are then unwound from the cable and continue tangentially outward therefrom onto the other guide roller 35. The successive portions of the belt then continue around the outer periphery of the head in a predetermined helical path of more than one convolution onto the one guide roller 35 to complete the path.

While in engagement with the cable, the successive portions of the loop 34 move axially therewith, although the loop 34 considered as a whole does not move axially but remains in a substantially fixed position. However, the loop 34, which grips the cable tightly and does not slip thereon, rotates about the axis of the cable in the same direction as does the twisting head 32 but at a slower rate so as to impart one twist to the cable 20 for each rotation of the cradle 23. The wrapping of successive portions of the belt 33 onto and off of the cable also causes the belt to advance in its path of travel on the twisting head 32. The angle of wrap of the loop-forming portion of the twisting belt 33 around the cable and the rate of rotation of the twisting head 32 vary in accordance with the size of the cable being fabricated.

It will be understood that the twisting head 32 is located a prescribed distance from the closing die 16 which distance is equal to the predetermined length of the section of cable to which the twisting force is to be applied in order to obtain a uniform predetermined twist in the cable with the last amount of undesirable torsional stress. The distance between the twisting head and the closing die and the length of the section therebetween likewise varies in accordance with the size of the cable being fabricated. The rate of rotation of the twisting head 32 is synchronized with the rate of rotation of the cradle 23 so that for each rotation of the cradle, the twisting device 30 imparts one twist to the cable 20 as the cradle advances axially through a predetermined distance.

To obtain a more accurate synchronization of the rotation of the twisting head 32 with the movement of the cable, a circuit adjusting element such as an adjustable inductor 60 is incorporated in the control circuit. The inductor comprises a coil 61 fixedly mounted on a stationary bracket 62 and a movable core 64 secured to the carriage 44. In the event the control circuit, in response to the signal generated by the tachometer 28, does not provide absolute synchronization between the rotation of the twisting head 32 and the rotation of the cradle 23 and the movement of the cable 20, the action of winding and unwinding of successive portions of the twisting belt 33 onto and off of the cable 20 will cause the twisting head 32, the carriage 44, and the inductor core 64 to move parallel to the axis 21 in one direction or the other. This movement of the inductor core 64 will cause a corresponding change in the control circuit and in the speed of the motor and of the twisting head to effect the twisting of the cable in synchronization with the rotation of the cradle.

In the operation of the apparatus, the cradle 23 and the take-up reel 24 are driven to advance the cable and to turn the cable about the horizontal axis 21 at uniform rates, and the twisting head 32 is rotated in synchronism therewith to twist the cable through one revolution for each revolution of the cradle. In the event that the twisting head 32 is not perfectly synchronized with the cradle drive and the cable take-up drive and rotates at a slightly faster or slower rate than required, the wrapping of the looped portion 34 of the belt around the cable 20 will be advanced or retarded, resulting in a forward or backward axial movement of the winding head 32. This axial movement of the winding head will impart a corresponding axial movement to the carriage 44 and the score 64 of the inductor 60 resulting in a corresponding adjustment of the control circuit, an increase or decrease in the electrical power to the motor 50, and an increase or decrease in the rate of rotation of the twisting head 32 to a condition of the required synchronization.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for twisting material of indefinite length moving along a predetermined axis which comprises:
    a twisting head mounted for rotation about said axis;
    an endless belt mounted on said twisting head for actuation thereby and for movement thereon along a predetermined path and having a portion thereof wound in a helical loop around the material in gripping engagement therewith, and
    drive means for rotating said twisting head to effect the twisting of the advancing material by said endless belt.

2. In an apparatus of the type described having means for advancing material of indefinite length along an axis, the combination thereof of:
    a hollow twisting head;
    means for supporting the twisting head for rotation about said axis and the advancing material;
    an endless belt mounted on said twisting head for actuation thereby and for movement thereon along a predetermined path and with a portion of said belt would to form a helical loop around and in gripping engagement with the material; and
    means for rotating said twisting head in timed relation to the advancing movement of the material to wind successive portions of said belt onto and off of the advancing material to impart a twist thereto.

3. A cable twisting apparatus comprising:
    a first means for supporting elongated cable components for movement into engagement with each other to form a cable and for holding the end of the cable against rotation;
    a second means in spaced relation to said first means for advancing the cable along an axis and for turning said cable about said axis;
    an endless belt for twisting said cable;
    means for supporting said belt intermediate said first and said second means for movement of said belt through a predetermined path and with a portion of said belt wound helically around the cable to form a loop in gripping engagement with the cable; and
    means for rotating said belt supporting means about said axis in timed relation to said second means to effect the winding and unwinding of successive loop forming portions of said belt onto and from successive portions of the advancing cable and the twisting of the cable about said axis.

4. A cable twisting apparatus comprising:
    a first means for supporting elongated cable components for movement into engagement with each other to form a cable and for holding the end of the cable against rotation;
    a cable take-up means for advancing said cable along an axis;
    a second means for supporting a portion of the cable and said cable take-up means for rotation about said axis;
    a first drive means for driving said take-up means and said second means in timed relation to each other;
    an endless belt;
    means rotatable about said axis intermediate said first means and said second means for supporting said endless belt with a portion thereof wound around the cable to form a helical loop in gripping engagement therewith for twisting the cable in response to rotation of said belt supporting means;
    a second drive means for rotating said belt supporting means; and
    control means for synchronizing said first and said second drive means.

5. A cable twisting apparatus comprising:
a first means for guiding elongated cable components; for movement into engagement with one another to form a cable and for holding one end of the cable against rotation;
a second means in spaced relation to said first means for advancing the cable along an axis and for turning the cable about said axis;
a hollow twisting head mounted for rotation about said axis intermediate said first means and said second means;
an endless belt mounted on said twisting head for actuation thereby and for movement thereon along a predetermined path and having a portion thereof wound in a helical loop around the cable in gripping engagement therewith; and
drive means for rotating said twisting head in synchronism with said second means to effect the twisting of the cable in timed relation to the turning of the cable about said axis.

6. A cable twisting apparatus comprising:
a first means for supporting elongated cable components for movement into engagement with each other to form a cable and for holding the end of the cable against rotation;
cable take-up means for advancing said cable along an axis;
cradle means for supporting said cable take-up means and the cable for rotation about said axis;
a first drive means for driving said cable take-up means and said cradle means in timed relation to each other;
a hollow twisting head mounted for rotation about said axis intermediate said first means and said cradle means;
an endless belt mounted on said twisting head for actuation thereby and for movement thereon along a predetermined path and having a portion thereof wound in a helical loop around the cable in gripping engagement therewith;
carriage means mounted for limited movement parallel to said first axis for supporting said twisting head for limited axial movement;
a second drive means mounted on said carriage means for driving said twisting head; and
control means including an adjustable control element responsive to axial movement of said carriage for synchronizing said first and said second drive means to effect the twisting of the cable in timed relation to the rotation of said cradle.

References Cited by the Examiner
UNITED STATES PATENTS

| | | | |
|---|---|---|---|
| 2,908,133 | 8/1959 | Brown | 57—77.4 |
| 3,090,189 | 4/1963 | Boussu et al. | 57—66.5 |

MERVIN STEIN, *Primary Examiner.*

D. E. WATKINS, *Assistant Examiner.*